Aug. 28, 1923.
J. T. PEDERSEN
1,466,458
COFFEE URN PUMP
Filed April 12, 1921
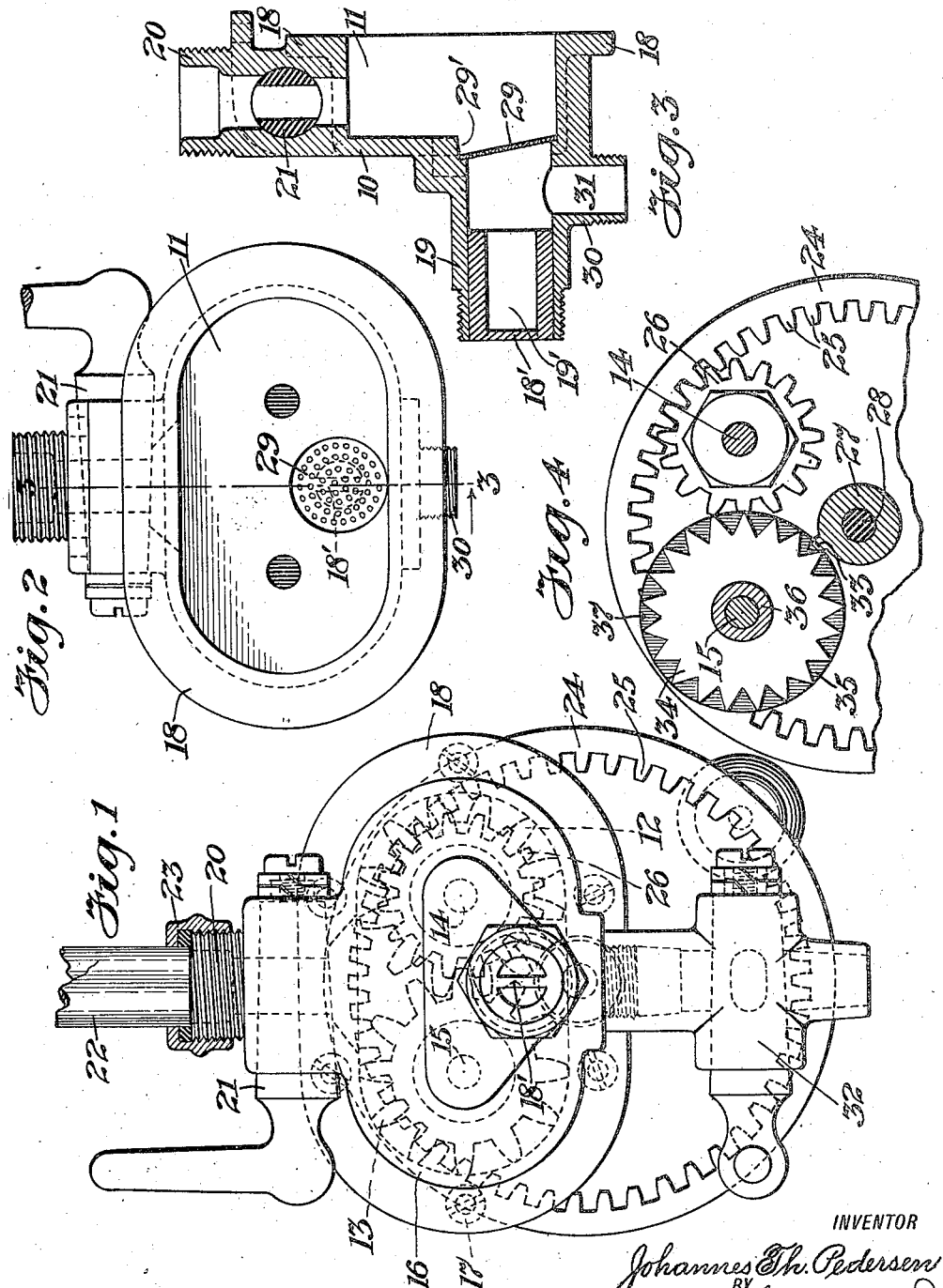
INVENTOR
Johannes Th. Pedersen
BY
HIS ATTORNEYS Patented Aug. 28, 1923.

1,466,458

UNITED STATES PATENT OFFICE.

JOHANNES TH. PEDERSEN, OF FLUSHING, NEW YORK, ASSIGNOR TO AARON M. SLOSS, OF NEW YORK, N. Y.

COFFEE-URN PUMP.

Application filed April 12, 1921. Serial No. 460,856.

*To all whom it may concern:*

Be it known that I, JOHANNES TH. PEDERSEN, a citizen of the United States, residing at Flushing, borough of Queens, city and State of New York, have invented an Improvement in Coffee-Urn Pumps, of which the following is a specification.

In order to obviate the necessity of manually repouring coffee, particularly in the use of large coffee urns as employed in hotels, restaurants and similar places, it has been proposed, as I am aware, to employ a pump attachment to a coffee urn and to associate the same with the usual gauge glass so that at predetermined intervals as may be necessary the coffee may be pumped from the bottom of the urn and delivered thereto at the top thereof passing through the guage glass which thereby serves the purpose not only of normally indicating the level of the liquid in the coffee urn but also as a passage for the coffee in transferring the same from the bottom to the top of the urn. In the use of these pumps difficulty has been experienced in the pump becoming clogged due to the accumulation of coffee grounds or other sediment and the construction has been such that difficulty has also been experienced in cleaning the pump. One of the objects of my invention is, therefore, to overcome this difficulty and in a pump of the class to which the invention relates to provide a sediment chamber and screen so arranged that the coffee grounds and sediment cannot pass to the pump, but on the contrary will accumulate in the sediment chamber which is so located that the same may be readily flushed and thereby kept clean so as not to interfere with the operation of the pump.

In pumps of the type to which this invention relates it is often desirable for the operator to know when a predetermined quantity of the liquid coffee has been passed through the pump, that is has been conveyed from the bottom of the urn to the top thereof and it is therefore the purpose of this invention to also include an indicating mechanism in conjunction with a coffee urn pump whereby the operator may easily determine when a predetermined quantity of liquid has been caused to pass through the pump from the bottom to the top of the urn. Such an indicating device consequently is included as a part of the present invention, and as illustrated and described it is preferably operated by the means for driving the pump.

The pump made in accordance with my invention is shown in the accompanying drawings, in which, Fig. 1 is a rear elevation and partial cross section of the coffee urn pump.

Fig. 2 is a front elevation with the cover and vanes removed to illustrate the location of the strainer.

Fig. 3 is a central longitudinal cross section, and

Fig. 4 is a sectional elevation illustrating the devices for driving the pump and the means for indicating the quantity of liquid handled by the pump and actuated by the driving mechanism.

In the drawing it will be seen that the pump made in accordance with this invention comprises a casing 10 in which there is provided a chamber 11 for the actuating rotor gears 12 and 13 consisting of a pair of spur gears, although as will be understood any suitable type of rotor gears may be employed. These rotors, however, are mounted respectively on shafts 14 and 15 which are journaled in the casing of the pump. The chamber is closed by a cover 16 extending over the same and secured in position by bolts 17 or otherwise passing through the cover and also through the flange 18 provided on the casing for this purpose. In the casing there is an inlet connection 19 preferably at the lower end thereof when the same is in an operative position and an outlet connection 20 which is preferably at the upper end thereof when the pump is in an operative position. In the outlet connection a valve cock 21 is suitably fitted to open and close the passage leading from the pump. The outlet connection is secured to the lower end of the gauge glass or tube 22 by a suitable gland 23 or otherwise and the upper end of the gauge glass is connected to the upper portion of the coffee urn in any usual manner, while, as will be understood, the inlet connection to the pump is suitably connected to the lower interior portion of the coffee urn.

It will be understood that the pump may be driven in any suitable manner. As illustrated, however, the pump is driven by a pulley 24 fitted with an internal gear 25 which meshes with a spur gear 26 mounted on the shaft 14 of the vane 12, the pulley 24 having a hub 27 which is suitably mounted on a shaft 28 secured to the cover or other part of the pump casing so that the pulley may be turned manually or otherwise to rotate the spur gear 26 and thus turn the shaft 15 to operate the rotors.

At the inner end of the inlet connection 19 suitably secured, frictionally or otherwise, in a recess provided therefor in the walls of the casing I employ a screen 29. This may be made of suitable sheet metal or other material and is suitably perforated to permit the passage of the liquid and to prevent the passage of the sediment. The inlet connection 19 is also provided with a branch 30 preferably depending therefrom and together with the outer end of the passage in the inlet connection to the pump provides a sediment chamber 31. Fitted to the branch 30 there is a drain cock 32 by means of which when turned to the open position the sediment chamber may be opened to a discharge. As will be seen by reference to Fig. 3 the screen 29 is preferably set at an angle to the face of the wall of the pump chamber so as to provide a pocket 29' for a liquid which, by the rotors of the pump when reversed, is forced through the perforations of the screen into the sediment chamber to clean the screen and clear the chamber, the sediment passing out through the connection 30. It will also be observed that the bore of the inlet 19' is considerably smaller than the bore of the sediment chamber at the outer end of the inlet and that at the inlet orifice I employ a cross bar 18' which prevents coffee grounds, or other sediment en masse, from entering the bore 19' and passing to the sediment chamber. These features have been found essential to a satisfactory working of the pump. It will be furthermore understood that by this means the pump inlet may be cleansed as often as it is necessary to keep the same free from sediment.

In coffee urn pumps of this type to which my invention relates, it is often desirable and sometimes necessary for the operator to be able to determine the quantity of liquid which has passed through the pump and in order to provide an indicating mechanism I prefer to employ a tooth 33 suitably connected to or made integral with the hub 27 of the pulley 24 and adapted to mesh with a gear wheel 34 mounted on an extension of the shaft 15 so as to turn freely thereon. The gear 34 carries a pulley 35 and this, as indicated, is fitted with a hub 36 which is mounted on the shaft 15 and in the periphery of the pulley 35 there is an indicating notch 37. As will be understood in the revolution of the pulley 24 the tooth 33 engages with the teeth of the gear 34 and the parts may be so designed that for a given revolution of the pulley 35 whereby the notch 37 is returned to an initial position the pump will handle, or there will be caused to pass through the same, a predetermined quantity of liquid, as for example the parts may be designed that when the pulley 35 has completed a revolution a gallon of liquid will have passed through the pump.

I claim as my invention:

1. In a coffee urn pump, a casing having an inlet connection, a screen set in the casing at an inclination to the direction of the flow of a liquid therethrough, a liner set in the said inlet connection and having a restricted orifice leading into the inlet connection, and a discharge pipe leading from the said inlet connection, the space in the inlet connection between the said screen, the liner and the interior of the said discharge pipe forming a sediment chamber from which, by the reversal of the pump, the sediment may be discharged.

2. In a coffee urn pump, a casing having an inlet connection, a screen placed at an inclination at the discharge orifice of the inlet connection, a liner of reduced diameter fitted in the outer end of the inlet connection, a cross bar extending across the said inlet member and restricting the inlet orifice thereto, and a discharge pipe leading from the inlet connection, the space within the inlet connection lying between the said screen and liner and the space within the discharge pipe forming a sediment chamber for preventing sediment from reaching the pump and also from which, by the reversal of the pump, the sediment may be discharged.

Signed by me this 18th day of March, 1921.

JOHANNES TH. PEDERSEN.